(12) United States Patent
Ha

(10) Patent No.: US 11,537,316 B2
(45) Date of Patent: Dec. 27, 2022

(54) DATA STORAGE DEVICE FOR STORING DATA IN SEQUENTIAL DATA AREA AND METHOD OF OPERATING THE SAME

(71) Applicant: SK hynix Inc., Icheon-si (KR)

(72) Inventor: Chan Ho Ha, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/156,450

(22) Filed: Jan. 22, 2021

(65) Prior Publication Data

US 2022/0035561 A1 Feb. 3, 2022

(30) Foreign Application Priority Data

Jul. 28, 2020 (KR) .......................... 10-2020-0094020

(51) Int. Cl.
*G06F 3/06* (2006.01)
(52) U.S. Cl.
CPC .......... *G06F 3/0656* (2013.01); *G06F 3/0619* (2013.01); *G06F 3/0659* (2013.01); *G06F 3/0673* (2013.01)
(58) Field of Classification Search
CPC .... G06F 3/0659; G06F 3/0619; G06F 3/0673; G06F 3/0656
See application file for complete search history.

(56) References Cited

U.S. PATENT DOCUMENTS

| | | | | |
|---|---|---|---|---|
| 9,563,549 | B2* | 2/2017 | Ahn | G06F 12/0246 |
| 2006/0026211 | A1* | 2/2006 | Potteiger | G06F 12/0804 |
| | | | | 711/E12.04 |
| 2009/0248964 | A1* | 10/2009 | Yano | G06F 3/0679 |
| | | | | 711/E12.001 |
| 2016/0268000 | A1* | 9/2016 | Thompson | G11C 16/20 |
| 2016/0378672 | A1* | 12/2016 | Dulloor | G06F 3/0688 |
| | | | | 711/135 |
| 2021/0406174 | A1* | 12/2021 | Gole | G06F 12/0868 |

FOREIGN PATENT DOCUMENTS

KR 10-1083673 B1 11/2011
KR 10-2074329 B1 2/2020

\* cited by examiner

*Primary Examiner* — Mark A Giardino, Jr.
(74) *Attorney, Agent, or Firm* — Perkins Coie LLP

(57) ABSTRACT

Provided herein may be a data storage device and a method of operating the same. The data storage device may include a memory device including a plurality of first data areas and a temporary data area, a buffer memory configured to temporarily store the data received from a host, and a memory controller configured to receive a first write request for writing the data and consecutive logical addresses from the host and write, upon occurrence of a trigger event that requires the data to be written to the memory device, the data to either the temporary data area or a first data area selected based on first data area information included in the first write request, depending on whether a size of the data is less than a preset reference size.

20 Claims, 15 Drawing Sheets

FIG. 4

MAP1

| LBA | MR |
|---|---|
| LBA1~25 | MR1_1 |
| LBA26~50 | MR1_2 |
| LBA51~75 | MR1_3 |
| LBA76~100 | MR1_4 |
| ⋮ | ⋮ |

FIG. 5

MAP2

| LBA | PBA1 |
|---|---|
| LBA1 | PBA1_1 |
| LBA2 | PBA1_2 |
| LBA3 | PBA1_3 |
| LBA4 | PBA1_4 |
| ⋮ | ⋮ |

FIG. 6

MAP3

| LBA | PBA2 |
|---|---|
| LBA1 | PBA2_1 |
| LBA2 | PBA2_2 |
| LBA3 | PBA2_3 |
| LBA4 | PBA2_4 |
| ⋮ | ⋮ |

DATA STORAGE DEVICE FOR STORING DATA IN SEQUENTIAL DATA AREA AND METHOD OF OPERATING THE SAME

CROSS-REFERENCE TO RELATED APPLICATION

This patent document claims priority to and benefits of the Korean patent application number 10-2020-0094020, filed on Jul. 28, 2020, which is incorporated herein by reference in its entirety.

TECHNICAL FIELD

Various embodiments of the technology disclosed in this patent document generally relate to an electronic device, and more particularly, to a data storage device and a method of operating the data storage device.

BACKGROUND

A data storage device is used to store data under the control of a host. The data storage device may include a memory device or memory medium, which stores data, and a memory controller, which controls the memory device. Memory devices may be classified into a volatile memory device and a nonvolatile memory device.

The volatile memory device may only retain its data while the device is powered and loses its data when power is lost. Examples of the volatile memory device may include a static random access memory (SRAM) and a dynamic random access memory (DRAM).

The nonvolatile memory device may retain stored data even in the absence of power supply and thus does not lose its data when power is lost. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

The embodiments of the disclosed technology relate to a data storage device that can improve the speed of a read operation by performing the read operation without requiring a logic for distinguishing dummy data from write data.

In an aspect, a data storage device is disclosed. In some embodiments of the disclosed technology, the data storage device may include a memory device including a plurality of first data areas and a temporary data area, each first data area and the temporary data area including memory cells structured to store data, a buffer memory coupled to the memory device and configured to temporarily store the data received from a host before writing the data to the plurality of first data areas or the temporary data area, and a memory controller configured to receive a first write request for writing the data and consecutive logical addresses from the host and write, upon occurrence of a trigger event that requires the data to be written to the memory device, the data to either the temporary data area or a first data area selected based on first data area information included in the first write request, depending on whether a size of the data is less than a preset reference size.

In another aspect, a data storage device is disclosed. In some embodiments of the disclosed technology, the data storage device may include a memory device including a sequential data area and a temporary data area, each sequential data area and the temporary data area including a plurality of memory cells structured to store data, a buffer memory coupled to the memory device and configured to temporarily store the data received from a host before writing the data to the plurality of sequential data areas or the temporary data area and a memory controller configured to receive a write request for writing the data and consecutive logical addresses from the host and write, upon occurrence of a trigger event that requires the data to be written to the memory device, the data to the temporary data area, wherein a size of the data is less than a unit for program corresponding to a size of data stored in the memory device by one program operation performed by the memory device.

In another aspect, a method of operating a memory controller controlling a memory device including a plurality of sequential data areas and a temporary data area is disclosed. In some embodiments of the disclosed technology, the method may include receiving data corresponding to any one sequential data area, among a plurality of sequential data areas, a logical address group including consecutive logical addresses, and a write request from a host, and controlling the memory device so that the data is stored in any one of the sequential data area and the temporary data area depending on whether a size of the data is less than a preset reference size.

In another aspect, a data storage device is disclosed. In some embodiments of the disclosed technology, the data storage device may include a memory device including a plurality of sequential data areas and a temporary data area, a buffer memory configured to temporarily store write data received from a host, and a memory controller configured to receive a first write request corresponding to the write data and consecutive logical addresses from the host, and to control the memory device so that, in response to occurrence of an event that requests storage of the write data in the memory device, the write data is stored in one of a sequential data area and the temporary data area depending on a size of the write data is less than a preset reference size, wherein the sequential data area corresponds to sequential data area information included in the first write request, among the plurality of sequential data areas.

In another aspect, a data storage device is disclosed. In some embodiments of the disclosed technology, the data storage device may include a memory device including a sequential data area and a temporary data area, a buffer memory configured to temporarily store write data received from a host, and a memory controller configured to receive a write request corresponding to the write data and consecutive logical addresses from the host, and to control the memory device so that, in response to occurrence of an event that requests storage of the write data in the memory device, the write data is stored in the temporary data area, wherein a size of the write data is less than a size of a program unit corresponding to a size of data stored in the memory device depending on one program operation performed by the memory device In another aspect, a method of operating a memory controller controlling a memory device including a plurality of sequential data areas and a temporary data area is disclosed. In some embodiments of the disclosed technology, the method may include receiving data corresponding to any one sequential data area, among a plurality of sequential data areas, a logical address group including consecutive logical addresses, and a write request from a host, and controlling the memory device so that the data is stored in any one of the sequential data area and the temporary data area depending on whether a size of the data is less than a preset reference size.

BRIEF DESCRIPTION OF THE DRAWINGS

FIGS. 4 to 6 are diagrams illustrating mapping tables based on an embodiment of the disclosed technology.

DETAILED DESCRIPTION

The technology disclosed in this patent document can be implemented in some embodiments to provide data storage devices and their operating methods that, among other features and benefits, can improve the speed of a read operation by performing a read operation without requiring to distinguish write data written or to be written to a memory device from certain special purpose data or dummy data that is inserted at an empty memory space of the memory device.

Figure 1:
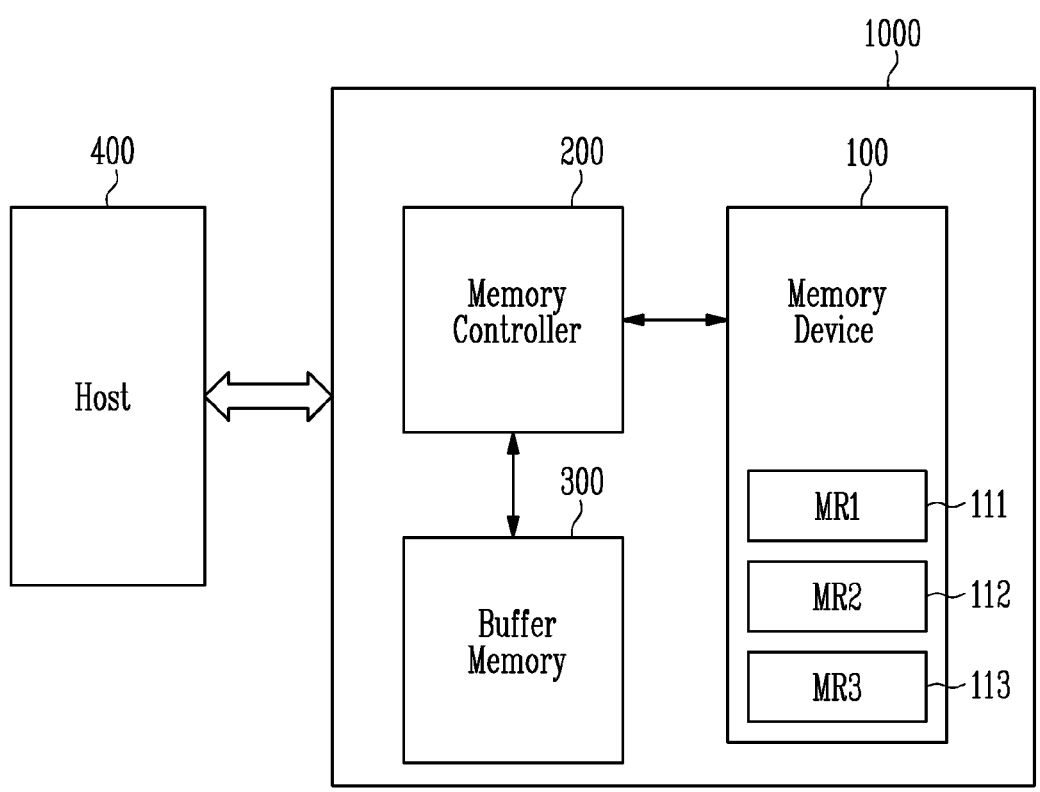
FIG. 1 is a diagram illustrating a storage system based on an embodiment of the disclosed technology.

FIG. 1 is a diagram illustrating a storage system based on an embodiment of the disclosed technology.

Referring to FIG. 1, the storage system may be implemented as a personal computer (PC), a data center, an enterprise data storage system, a data processing system including a direct attached storage (DAS), a data processing system including a storage area network (SAN), or a data processing system including a network attached storage (NAS).

The storage system may include a data storage device 1000 and a host 400.

The data storage device 1000 may store data in response to a request received from the host 400, such as a mobile phone, a smartphone, an MP3 player, a laptop computer, a desktop computer, a game console, a TV, a tablet PC, or an in-vehicle infotainment system.

The data storage device 1000 may be implemented in any one of various types of data storage devices that is compatible to a host interface in communication with the host 400. Examples of the data storage device 1000 may include a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) data storage device, a universal flash storage (UFS) device, a personal computer memory card international association (PCMCIA) card-type data storage device, a peripheral component interconnect (PCI)-card type data storage device, a PCI express (PCI-E) card-type data storage device, a compact flash (CF) card, a smart media card, and a memory stick.

The package types of the data storage device 1000 may include package on package (POP), system in package (SIP), system on chip (SOC), multi-chip package (MCP), chip on board (COB), wafer-level fabricated package (WFP), and wafer-level stack package (WSP).

The data storage device 1000 may include a memory device 100, a memory controller 200, and a buffer memory 300.

The memory device 100 may be operated to store data in response to commands and instructions of the memory controller 200. In some implementations, the memory device 100 may receive a command and an address from the memory controller 200, and may access a memory cell selected from among memory cells (not illustrated) by the address. The memory device 100 may perform an operation instructed by the command on the memory cell selected by the address.

The command may be, for example, a program command, a read command or an erase command, and the operation indicated by the command may be, for example, a program operation (or a write operation), a read operation or an erase operation.

The memory device 100 may perform program operations. For example, upon receiving a program command, an address, and data, the memory device 100 may write the data to the memory cell selected by the address. In this patent document, the data to be written to the selected memory cell is referred to as "write data."

In addition, the memory device 100 may perform read operations. For example, upon receiving a read command and an address, the memory device 100 may read data from the area of a memory cell array (not illustrated), selected by the address. In this patent document, data read or to be read from the selected area of the memory device 100 is referred to as "read data."

Furthermore, the memory device 100 may perform erase operations. For example, upon receiving an erase command and an address, the memory device 100 may erase data stored in the area selected by the address.

In an embodiment, the memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM).

In some implementations, the memory device 100 may be a NAND flash memory.

The memory device 100 may store the write data, or may read the stored read data and provide the read data to the memory controller 200, under the control of the memory controller 200.

The memory device 100 may include one or more plane, and each plane may include a memory cell array including a plurality of memory cells configured to store write data.

The memory cell array may include a plurality of first data areas (also referred to as "sequential data areas" in this patent document) 111, a temporary data area 112, and a metadata area 113.

The sequential data areas 111 may be logical areas defined for the purpose of handling write data based on a logical address group provided by the host 400. In the sequential data areas 111, write data having a size corresponding to a preset reference size may be stored.

Each sequential data area 111 may correspond to at least one logical address group. In some implementations, a plurality of sequential data areas 111 may be mapped to a plurality of logical address groups. Each of the logical address groups may be a group including consecutive logical addresses, among logical addresses to be provided by the host 400. Here, the consecutive logical addresses may be consecutive logical addresses, the numbers of which are consecutively arranged. For example, logical addresses 1 and 2 may be consecutive logical addresses, and logical addresses 7, 8 and 9 may also be consecutive logical addresses. The specific numbers of consecutive logical addresses discussed in this document are provided by way of example only.

A plurality of memory blocks (not illustrated) may be allocated to each sequential data area 111. A memory block may be the minimum unit for erase operations.

Each memory block may include a plurality of pages (not illustrated). Each page may be the minimum unit for program and read operations.

The temporary data area 112 may be an area in which write data having a size less than the preset reference size is stored. The temporary data area 112 may include a plurality of memory blocks.

The metadata area 113 may be a memory area allocated to store metadata for the write data provided by the host 400. The metadata area 113 may be an area allocated to store map data of the data stored in the sequential data areas 111. In some implementations, the metadata area 113 may be an area allocated to store map data of the data stored in the temporary data area 112. The metadata area 113 may include a plurality of memory blocks.

The map data may be used for mapping between consecutive logical addresses and the sequential data areas 111. In some implementations, the map data may be used for mapping between logical addresses and physical addresses of memory blocks allocated to the sequential data areas 111. In some implementations, the map data may be data indicating mapping relationships between consecutive logical addresses and physical addresses of pages included in the temporary data area 112.

The memory controller 200 may control the overall operation of the data storage device 1000.

When power is applied to the data storage device 1000, the memory controller 200 may run firmware (FW). When the memory device 100 is a flash memory device, the firmware may include a host interface layer, a flash translation layer, and a flash interface layer.

The host interface layer may control an operation between the host 400 and the memory controller 200.

The flash translation layer may perform logical to physical address mapping by translating a logical address provided from the host 400 into a physical address. For this operation, the memory controller 200 may store map data indicating corresponding relationships between logical addresses and physical addresses.

The flash interface layer may provide a communication interface between the memory controller 200 and the memory device 100.

The memory controller 200 may control operations of the memory device 100 such as a program operation, a read operation, and an erase operation in response to a write request, a read request, and an erase request, respectively, from the host 400.

During a program operation, the memory controller 200 may provide a program command, a physical address, and write data to the memory device 100.

During a read operation, the memory controller 200 may provide a read command and a physical address to the memory device 100.

During an erase operation, the memory controller 200 may provide an erase command and a physical address to the memory device 100.

The memory controller 200 may autonomously generate a command, an address, and data regardless of the request provided from the host 400. The memory controller 200 may transmit the autonomously generated command, address, and data to the memory device 100.

For example, the memory controller 200 may generate a command, an address, and data required in order to perform a background operation. Further, the memory controller 200 may transmit the command, address, and data to the memory device 100.

The background operation may be at least one of a wear leveling operation, a read reclaim operation, and a garbage collection operation.

The wear leveling operation may be an operation of storing the numbers of erase operations performed on memory blocks and programming data to a memory block on which the number of erase operations is the smallest.

The read reclaim operation may be an operation of moving data stored in a memory block to another memory block before uncorrectable error occurs in the data stored in the memory block.

The garbage collection operation may be an operation of copying valid data included in a bad block, among memory blocks, to a free block and erasing invalid data included in the bad block.

The memory controller 200 may control two or more memory devices 100. In this case, the memory controller 200 may control the memory devices 100 depending on an interleaving scheme to improve operation performance.

The interleaving scheme may be a scheme for controlling the memory devices 100 so that the operations of two or more memory devices 100 overlap each other. In an embodiment, the memory controller 200 may receive write data, a write request corresponding to the write data, and consecutive logical addresses from the host 400. The memory controller 200 may control the memory device 100 so that, upon occurrence of a trigger event requiring the write data to be stored in the memory device 100, the write data is stored in any one of a sequential data area 111, and the temporary data area 112 depending on the size of the write data is less than a preset reference size. Here, the sequential data area 111 may be a sequential data area corresponding to sequential data area information contained in the write request, among the plurality of sequential data areas.

The sequential data area 111 may be referred to as a "zone." The sequential data area 111 may have an open state and a closed state based on a request received from the host 400.

For example, the host 400 may provide a manage command (or a zone open request) that requests the opening of the sequential data area 111 to the data storage device 1000, and the memory controller 200 may open the corresponding sequential data area in response to the manage command. Here, the zone open request may indicate a request for the generation of a mapping table for a logical address group corresponding to the sequential data area, and the opening of the sequential data area may indicate the generation of a mapping table for a logical address group corresponding to the sequential data area. In this patent document, the manage command and the zone open request, which request the opening of the sequential data area 111, may be used to indicate the same instruction or operation.

For example, the host 400 may provide a manage command (or a zone close request) that requests the closing of the sequential data area to the data storage device 1000, and the memory controller 200 may change the state of the sequential data area to a closed state in response to the manage command. Here, the zone close request may be a request indicating that a write request for the corresponding sequential data area is not to be made until a zone open request for the sequential data area is input. The closing of the sequential data area may indicate a situation where a write operation is not to be performed on the sequential data area until the zone open request for the corresponding sequential data area is input to the data storage device 1000. In this patent document, a manage command and a zone close request, which request the closing of the sequential data area 111, may be used to indicate the same instruction or operation.

In some implementations, the memory controller 200 may move data temporarily held by the buffer memory 300 to a non-volatile memory (e.g., the memory device 100) to achieve persistency upon occurrence of a trigger event. In an example, the trigger event may be a sudden power-off resulting in an interruption of power supply to the data storage device 1000. In another example, the trigger event may be the receipt of a flush request by the data storage device 1000 from the host 400. Here, the flush request may be an instruction to transfer the write data stored in the buffer memory 300 to the memory device 100. As another example, the trigger event may be the receipt of a zone close request by the data storage device 1000 from the host 400.

In some implementations, the data storage device 1000 may include a volatile buffer (e.g., the buffer memory 300) to hold data before writing to a nonvolatile memory device. However, the adoption of a volatile buffer can be one cause of data loss in a power outage. The flush request (or flush command) can be used to resolve this issue by forcing all the pending write data from a volatile memory device to a non-volatile memory device (e.g., the memory device 100), ensuring persistence and accuracy of data.

The buffer memory 300 may temporarily store data provided by the host 400. In some implementations, the buffer memory 300 may temporarily store data provided from the memory device 100. For this operation, the buffer memory 300 may include sequential buffers.

In an embodiment, the memory controller 200 may store write data provided from the host 400 in a sequential buffer corresponding to the logical address of the write data, among the sequential buffers. The memory controller 200 may control the memory device 100 so that the write data is stored on a preset reference size basis in a sequential data area corresponding to the sequential buffer, among the plurality of sequential data areas.

The buffer memory 300 may store mapping tables that include map data indicating corresponding relationships between logical addresses and physical addresses. In some implementations, the buffer memory 300 may include a map buffer (not illustrated) for storing a plurality of mapping tables.

The buffer memory 300 may be present outside the memory controller 200, as illustrated in FIG. 1. In some implementations, although not illustrated in the drawing, the buffer memory 300 may be included in the memory controller 200.

In an embodiment, the memory device 300 may be implemented as any one of a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a resistive RAM (RRAM), a phase-change memory (PRAM), a magnetoresistive RAM (MRAM), a ferroelectric RAM (FRAM), or a spin transfer torque RAM (STT-RAM).

The host 400 may communicate with the data storage device 1000 through an interface (not illustrated).

Examples of the interface may include a serial advanced technology attachment (SATA) interface, a SATA express (SATAe) interface, a serial attached small computer system interface (SAS), a peripheral component interconnect express (PCIe) interface, a non-volatile memory Express (NVMe) interface, an advanced host controller interface (AHCI) interface, or a multimedia card interface.

The host 400 may communicate with the data storage device 1000 to store write data in the data storage device 1000 or to acquire read data stored in the data storage device 1000.

In an embodiment, the host 400 may provide the data storage device 1000 with a write request requesting the data storage device 1000 to store write data. Also, the host 400 may provide a write request, write data, and a logical address for identifying the write data to the data storage device 1000.

The data storage device 1000 may store the write data provided from the host 400 in the memory device 100 in response to the write request provided from the host 400, and may provide a response indicating the completion of the storage to the host 400.

In an embodiment, the write request may contain first data area information (also referred as "sequential data area information" in this patent document).

In an embodiment, the host 400 may provide a manage command to the data storage device 1000. The manage command may be an open command instructing a free block, to which data is to be written during the program operation, to be allocated to the sequential data area 111 corresponding to the sequential data area information. In some implementations, the manage command may be a close command instructing the interruption of allocation of a free block to the sequential data area 111 corresponding to the sequential data area information, as will be discussed below with reference to FIGS. 8 to 12.

In an embodiment, the host 400 may provide the data storage device 100 with a read request requesting the data stored in the data storage device 1000 to be provided to the host 400. Also, the host 400 may provide the read request and a read address to the data storage device 1000.

The data storage device 1000 may read data, corresponding to the read address provided from the host 400, from the memory device 100 in response to the read request provided from the host 400, and may provide the read data as a response to the read request to the host 400.

Figure 2:
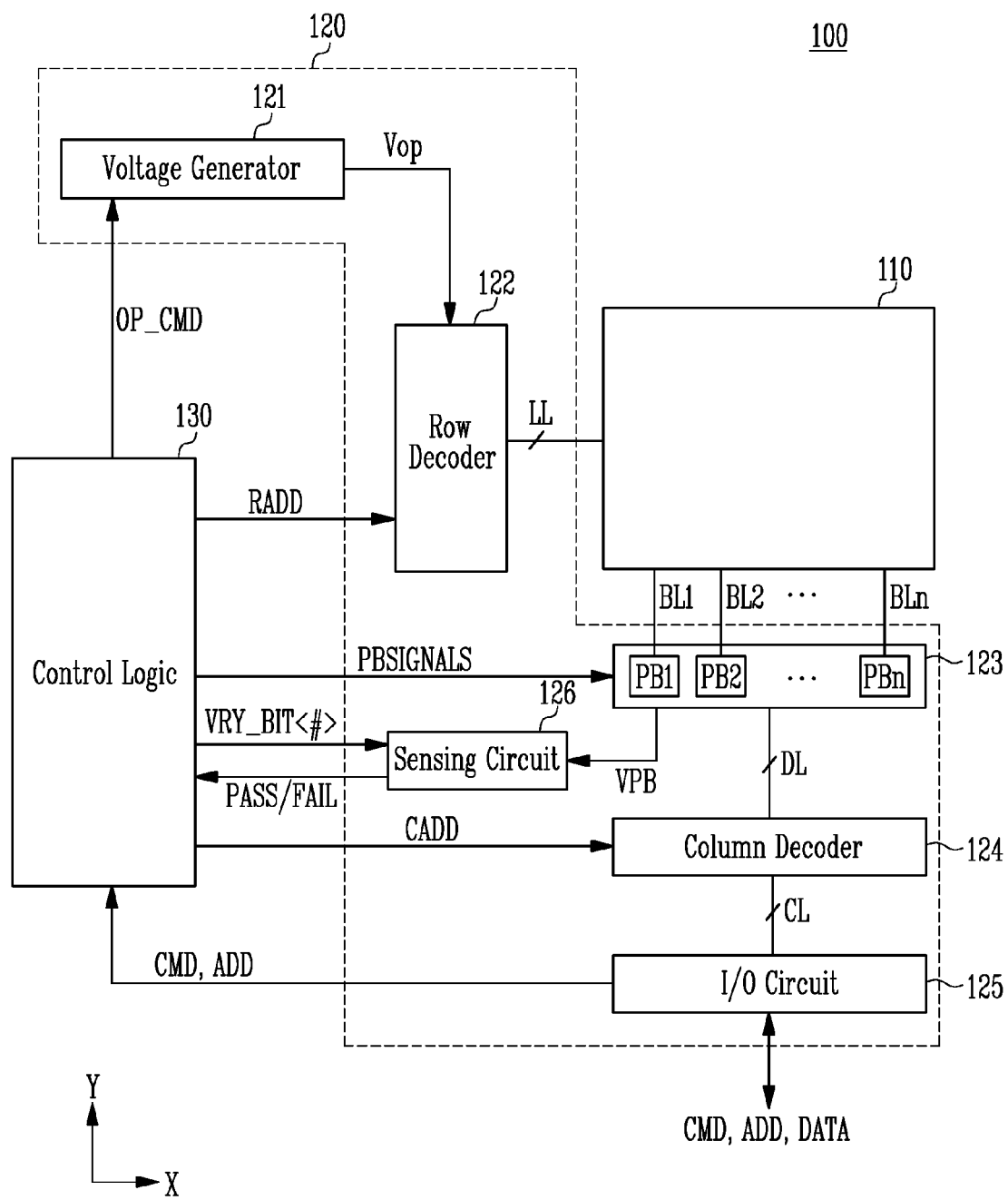
FIG. 2 is a diagram illustrating a memory device based on an embodiment of the disclosed technology.

FIG. 2 is a diagram illustrating a memory device based on an embodiment of the disclosed technology.

Referring to FIGS. 1 and 2, the memory device 100 may include a memory cell array 110, a peripheral circuit 120, and a control logic 130.

The memory cell array 110 may include a plurality of memory blocks (not illustrated).

Local lines LL and bit lines BL1 to BLn (where n is a positive integer) may be coupled to each of the memory blocks.

The local lines LL may be coupled to each of the memory blocks.

Although not illustrated in the drawing, the local lines LL may include a first select line, a second select line, and a plurality of word lines arranged between the first and second select lines. In this patent document, the term "line" is used to indicate a bus (e.g., a control bus, address bus, and data bus, etc.) and any type of signal lines and interconnects that can carry electrical signals.

Although not illustrated in the drawing, the local lines LL may further include additional or dummy lines arranged between the first select line and the word lines, additional or dummy lines arranged between the second select line and the word lines, and pipelines.

The bit lines BL1 to BLn may be coupled in common to the memory blocks.

The memory blocks may be implemented in a two-dimensional (2D) or three-dimensional (3D) array structure.

For example, memory cells in the memory blocks having a 2D structure may be horizontally arranged on a substrate.

For example, memory cells in the memory blocks having a 3D structure may be vertically stacked on a substrate.

The peripheral circuit 120 may include a voltage generator 121, a row decoder 122, a page buffer group 123, a column decoder 124, an input/output (I/O) circuit 125, and a sensing circuit 126.

The voltage generator 121 may generate various operating voltages Vop required for a program operation, a read operation, and an erase operation in response to an operation signal OP_CMD. Further, the voltage generator 121 may selectively discharge the local lines LL in response to the operation signal OP_CMD. For example, the voltage generator 121 may generate a program voltage, a verify voltage, pass voltages, a turn-on voltage, a read voltage, an erase voltage, a source line voltage, etc. under the control of the control logic 130.

In an embodiment, the voltage generator 121 may generate an internal supply voltage by regulating an external supply voltage. The internal supply voltage generated by the voltage generator 121 may be used as an operating voltage for the memory device 100.

In an embodiment, the voltage generator 121 may generate a plurality of voltages using the external supply voltage or the internal supply voltage. For example, the voltage generator 121 may include a plurality of pumping capacitors for receiving the internal supply voltage and generate a plurality of voltages by selectively enabling the plurality of pumping capacitors under the control of the control logic 130. The generated voltages may be supplied to the memory cell array 110 by the row decoder 122.

The row decoder 122 may transfer the operating voltages Vop to the local lines LL in response to a row address RADD. The operating voltages Vop may be transferred to a selected memory block through the local lines LL.

For example, during a program operation, the row decoder 122 may apply a program voltage to a selected word line and apply a program pass voltage having a level lower than that of the program voltage to unselected word lines. During a program verify operation, the row decoder 122 may apply a verify voltage to a selected word line and apply a verify pass voltage higher than the verify voltage to unselected word lines.

During a read operation, the row decoder 122 may apply a read voltage to a selected word line and apply a read pass voltage higher than the read voltage to unselected word lines.

During an erase operation, the row decoder 122 may select one memory block based on a decoded address. During the erase operation, the row decoder 122 may apply a ground voltage to word lines coupled to the selected memory block.

The page buffer group 123 may include first to n-th page buffers PB1 to PBn. The first to n-th page buffers PB1 to PBn may be coupled to the memory cell array 110 through the first to n-th bit lines BL1 to BLn, respectively. The first to n-th page buffers PB1 to PBn may be operated under the control of the control logic 130.

In detail, the first to n-th page buffers PB1 to PBn may be operated in response to page buffer control signals PBSIGNALS. For example, the first to n-th page buffers PB1 to PBn may temporarily store data received through the first to n-th bit lines BL1 to BLn, or may sense voltages or currents of the bit lines BL1 to BLn during a read or verify operation.

During a program operation, when the program voltage is applied to the selected word line, the first to n-th page buffers PB1 to PBn may transfer data DATA, received through the column decoder 124 and the input/output circuit 125, to selected memory cells through the first to n-th bit lines BL1 to BLn. The memory cells in a selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibition voltage (for example, a supply voltage) is applied may be maintained.

During a verify operation, the first to n-th page buffers PB1 to PBn may sense data stored in the selected memory cells from the selected memory cells through the first to n-th bit lines BL1 to BLn.

During a read operation, the first to n-th page buffers PB1 to PBn may sense data DATA from the memory cells in the selected page through the first to n-th bit lines BL1 to BLn, and may output the sensed data DATA to the input/output circuit 125 under the control of the column decoder 124.

During an erase operation, the first to n-th page buffers PB1 to PBn may allow the first to n-th bit lines BL1 to BLn to float.

The column decoder 124 may transfer data between the input/output circuit 125 and the page buffer group 123 in response to a column address CADD. For example, the column decoder 124 may exchange data with the first to nth page buffers PB1 to PBn through data lines DL, or may exchange data with the input/output circuit 125 through column lines CL.

The input/output circuit 125 may transfer a command CMD and an address ADD, received from the memory controller 200, to the control logic 130, or may exchange the data DATA with the column decoder 124.

During a read operation or a verify operation, the sensing circuit 126 may generate a reference current in response to an enable bit VRY_BIT<#>, and may compare a sensing voltage VPB, received from the page buffer group 123, with a reference voltage generated by the reference current and output a pass signal PASS or a fail signal FAIL.

The control logic 130 may output the operation signal OP_CMD, the row address RADD, the page buffer control signals PBSIGNALS, and the enable bit VRY_BIT<#> in response to the command CMD and the address ADD, and may then control the peripheral circuit 120.

Figure 3:
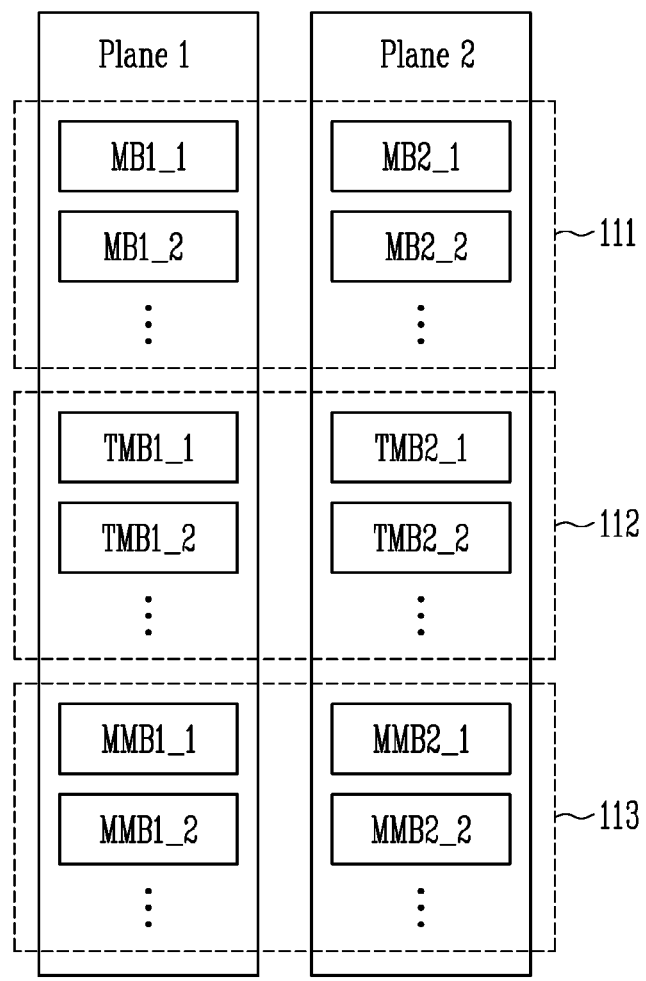
FIG. 3 is a diagram illustrating a memory area based on an embodiment of the disclosed technology.

FIG. 3 is a diagram illustrating a memory area based on an embodiment of the disclosed technology.

Referring to FIG. 3, a memory area 10 based on an embodiment of the disclosed technology may include a sequential data area 111, a temporary data area 112, and a metadata area 113.

Each of the sequential data area 111, the temporary data area 112, and the metadata area 113 may include a plurality of memory blocks.

In an embodiment, the sequential data area 111 may include a plurality of memory blocks MB1_1 and MB1_2 included in a first plane Plane1 of a memory device 100 and a plurality of memory blocks MB2_1 and MB2_2 included in a second plane Plane2 of the memory device 100.

Write data having a size corresponding to a reference size may be stored in the plurality of memory blocks MB1_1, MB1_2, MB2_1, and MB2_2 included in the sequential data area 111.

In an embodiment, the temporary data area 112 may include a plurality of memory blocks TMB1_1 and TMB1_2 included in the first plane Plane1 of the memory device 100 and a plurality of memory blocks TMB2_1 and TMB2_2 included in the second plane Plane2 of the memory device 100.

In an embodiment, the metadata area 113 may include a plurality of memory blocks MMB1_1 and MMB1_2 included in the first plane Plane1 of the memory device 100 and a plurality of memory blocks MMB2_1 and MMB2_2 included in the second plane Plane2 of the memory device 100.

The numbers of planes, memory blocks, sequential data areas 111, temporary data areas 112, and metadata areas 113 in FIG. 3 are illustrated by way of example and may vary depending on the memory device 100.

FIGS. 4 to 6 are diagrams illustrating mapping tables based on an embodiment of the disclosed technology.

Referring to FIG. 4, a first mapping table MAP1 may include map data related to mapping relationships between a plurality of logical address groups and a plurality of sequential data areas. In some implementations, the first mapping table MAP1 may include map data indicating corresponding relationships between consecutive logical addresses LBA and sequential data areas MR.

For example, a logical address group including LBA1 to LBA13 may correspond to a first sequential data area MR1_1. An additional logical address group including LBA14 to LBA25 may also correspond to the first sequential data area MR1_1. That is, the logical address group including LBA1 to LBA25 may correspond to the first sequential data area MR1_1.

For example, a logical address group including LBA26 to LBA37 may correspond to a second sequential data area MR1_2. An additional logical address group including LBA38 to LBA50 may also correspond to the second sequential data area MR1_2. That is, the logical address group including LBA26 to LBA50 may correspond to the second sequential data area MR1_2.

For example, a logical address group including LBA51 to LBA75 may correspond to a third sequential data area MR1_3, and a logical address group including LBA76 to LBA100 may correspond to a fourth sequential data area MR1_4.

As illustrated in FIG. 4, consecutive logical addresses are provided only for better understanding of the present embodiment and are not limited thereto.

Referring to FIG. 5, a second mapping table MAP2 may include map data indicating corresponding relationships between logical addresses LBA and first physical addresses PBA1 of a sequential data area 111. Here, the first physical addresses PBA1 of the sequential data area 111 illustrated in FIG. 5 may indicate the physical address of at least one memory block included in the sequential data area 111.

For example, LBA1 may correspond to PBA1_1, LBA2 may correspond to PBA1_2, LBA3 may correspond to PBA1_3, and LBA4 may correspond to PBA1_4. However, the disclosed technology is not limited thereto.

When the host 400 provides a write request containing sequential data area information, a logical address group, and data to the data storage device 1000, the memory controller 200 may control the memory device 100 so that write data is stored in the sequential data area 111 corresponding to the sequential data area information with reference to the first mapping table MAP1 and the second mapping table MAP2.

Referring to FIG. 5, the second mapping table MAP2 may include map data indicating corresponding relationships between the logical addresses LBA and the first physical addresses PBA1. Here, the first physical addresses PBA1 illustrated in FIG. 5 may indicate the physical address of at least one memory block included in any one sequential data area 111, among a plurality of sequential data areas.

Referring to FIG. 6, a third mapping table MAP3 may include map data indicating corresponding relationships between logical addresses LBA and second physical addresses PBA2 of a temporary data area 112. Here, the second physical addresses PBA2 of the temporary data area 112 illustrated in FIG. 6 may indicate the physical address of a page included in the temporary data area 112.

For example, LBA 1 may correspond to PBA2_1, LBA 2 may correspond to PBA2_2, LBA 3 may correspond to PBA2_3, and LBA4 may correspond to PBA2_4. However, the disclosed technology is not limited thereto.

The memory controller 200 may control the memory device 100 so that pieces of write data having a size less than a reference size are stored in the temporary data area 112 with reference to the first mapping table MAP1 to the third mapping table MAP3.

Figure 7:
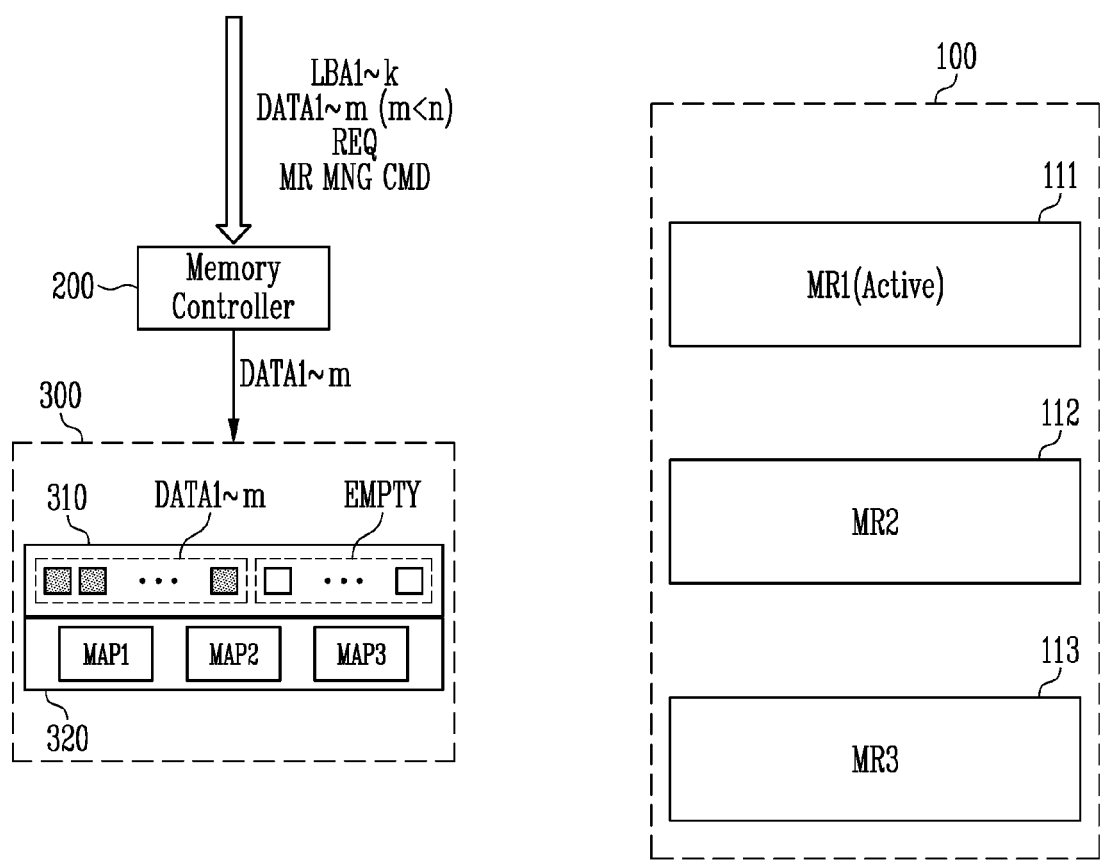
FIG. 7 shows an example where the write data having a size less than a reference size is stored in a buffer memory.

FIG. 7 shows an example where the write data having a size less than a reference size is stored in a buffer memory.

Referring to FIG. 7, the memory controller 200 may receive a logical address group, write data DATA1 to DATAm (where m is a positive integer less than n), a write request REQ, and a manage command MR MNG CMD from the host 400.

The logical address group may include consecutive logical addresses LBA1 to LBAk (where k is a positive integer). The logical addresses LBA1 to LBAk of FIG. 7 are only examples for explaining an embodiment of the disclosed technology, and the disclosed technology is not limited thereto.

In an embodiment, the write request REQ may contain sequential data area information (not illustrated). Since a sequential data area may be designated as a zone, the sequential data area information may be designated as a zone ID.

The manage command MR MNG CMD of FIG. 7 may be a command requesting the opening of a sequential data area 111 corresponding to the sequential data area information. That is, the manage command MR MNG CMD of FIG. 7 may be a zone open request that requests the generation of a mapping table (e.g., a first mapping table MAP1) for logical addresses corresponding to the sequential data area 111 corresponding to the sequential data area information. In this case, the sequential data area 111 may be in an open state or an active state.

The memory controller 200 may temporarily store the write data DATA1 to DATAm in a sequential buffer 310 of the buffer memory 300.

When the size of the write data DATA1 to DATAm is less than a preference size (e.g., the size of the sequential buffer 310), redundant storage capacity EMPTY obtained by excluding the size of the write data DATA1 to DATAm from the reference size may be present, as illustrated in FIG. 7.

In a map buffer 320 of the buffer memory 300, a first mapping table MAP1, a second mapping table MAP2, and a third mapping table MAP3 may be stored.

Figure 8:
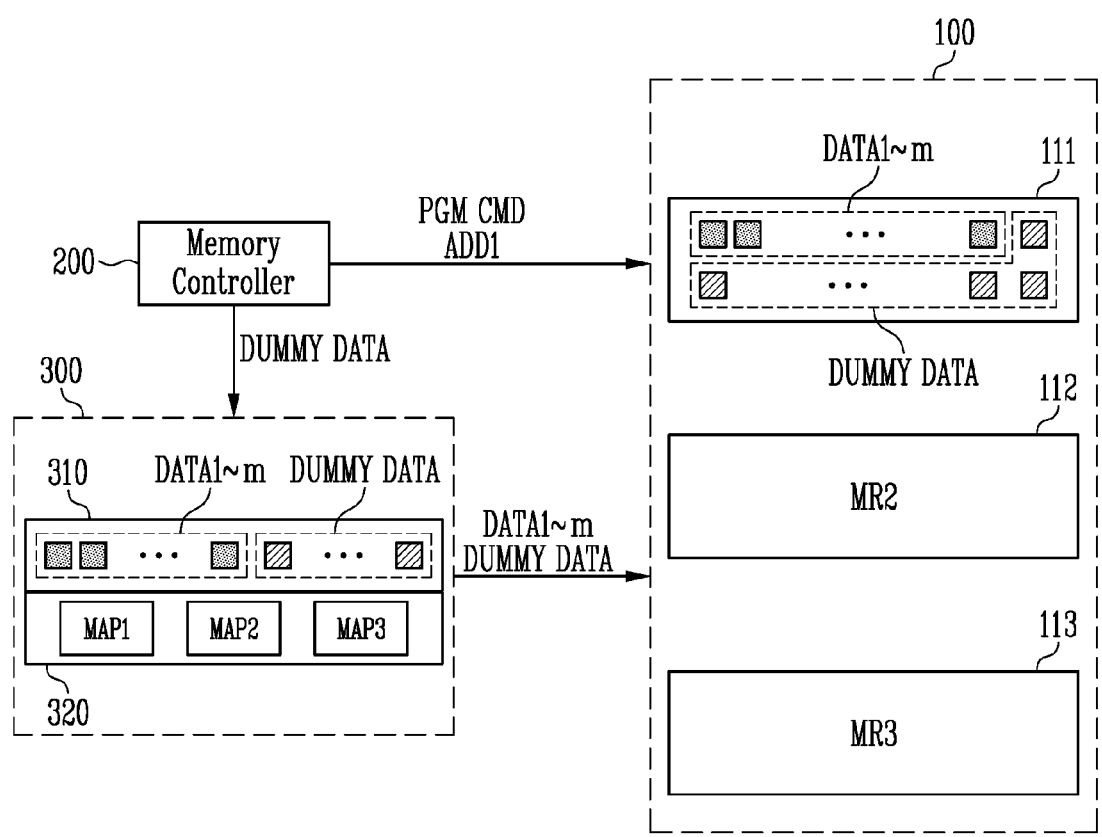
FIG. 8 shows an example where the write data having a size less than a reference size is stored in a sequential data area.

FIG. 8 shows an example where the write data having a size less than a reference size is stored in a sequential data area.

Referring to FIG. 8, the memory controller 200 may control the memory device 100 so that, in response to occurrence of a trigger event requesting the storage of write data DATA1 to DATAm in the memory device 100, write data having a size corresponding to a reference size, among pieces of write data stored in a sequential buffer 310, is stored in a sequential data area 111 corresponding to the sequential data area information. A program operation is performed by setting the write data having a size corresponding to the reference size to a program unit (a unit for program, e.g., minimum unit for program operation), and thus the efficiency of the program operation may be increased.

In an embodiment, the trigger event may be a zone close request (not illustrated) or a flush request provided from the host 400.

As illustrated in FIGS. 7 and 8, when the size of the write data DATA1 to DATAm provided by the host 400 is less than the reference size, a trigger event, such as a zone close request (not illustrated), a flush request, or a sudden power-off, may occur. In this case, the memory controller 200 may generate some additional data or dummy data DUMMY DATA for filling the redundant memory capacity EMPTY, and may store the dummy data DUMMY DATA in the sequential buffer 310. In various implementations, such additional data may be "dummy data" to indicate such additional data does not contain any useful information, but serves to reserve memory space or fill out empty memory spaces of a memory device that includes useful data.

In this case, the sum of the size of the write data DATA1 to DATAm provided by the host 400 and the size of the dummy data DUMMY DATA may correspond to the size of the sequential buffer 310. The memory controller 200 may provide a first address ADD1 of the sequential data area 111 and a program command PGM CMD to the memory device 100. The write data DATA1 to DATAm and the dummy data DUMMY DATA may be provided to the memory device 100, and may be stored in the sequential data area 111 of the memory device 100.

The first address ADD1 of the sequential data area 111 may be an address generated by the memory controller 200 with reference to the first mapping table MAP1 and the second mapping table MAP2 included in the map buffer 320.

In some implementations, the host 400 may provide a read request (not illustrated) for the write data DATA1 to DATAm to the data storage device 1000. In this case, the memory controller 200 may require a separate logic for reading the write data DATA1 to DATAm, among pieces of data stored in the sequential data area 111. The logic which reads only the write data DATA1 to DATAm, among the pieces of data stored in the sequential data area 111, may be the cause of delaying a read operation. Therefore, in order to prevent the read operation from being delayed, only the write data having a size corresponding to the reference size needs to be stored in the sequential data area 111.

Figure 9:
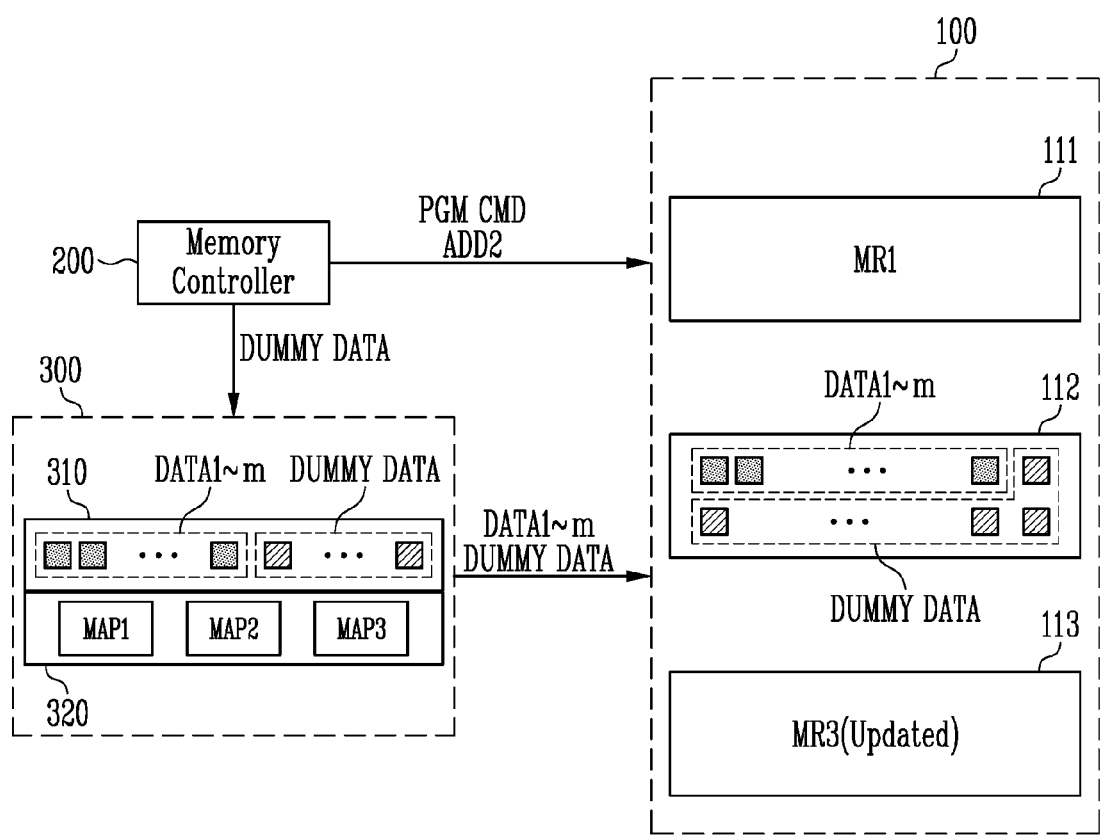
FIG. 9 shows an example where the write data having a size less than a reference size is stored in a temporary data area.

FIG. 9 shows an example where the write data having a size less than a reference size is stored in a temporary data area.

As described above with reference to FIG. 7, the memory controller 200 may receive a logical address group including logical addresses LBA1 to LBAk, write data DATA1 to DATAm, and a write request REQ from the host 400. The memory controller 200 may store the write data DATA1 to DATAm in the sequential buffer 310.

In some implementations, a trigger event, such as a sudden power-off, a zone close request, or a flush request, may occur. In this case, as illustrated in FIG. 9, the memory controller 200 may compare the size of the write data DATA1 to DATAm stored in the sequential buffer 310 with a preset reference size, and may control the memory device 100 so that, based on the result of the comparison, the write data DATA1 to DATAm is stored in the sequential data area 111 or the temporary data area 112.

In an embodiment, the reference size may be a size corresponding to the program unit of the memory device 100. In some implementations, the reference size may be the size of a program unit corresponding to the size of data that is stored in the memory device 100 based on one program operation.

In an embodiment, the reference size may be equal to the size of the sequential buffer 310. However, the disclosed technology is not limited thereto.

When the size of the write data DATA1 to DATAm is less than the reference size, the memory controller 200 may control the memory device 100 so that the write data DATA1 to DATAm is stored in the temporary data area 112. Even in this case, as described above with reference to FIG. 8, in order to perform a program operation on a preset program unit, the memory controller 200 may generate dummy (additional) data DUMMY DATA, and may store the dummy data in the sequential buffer 310.

In an embodiment, the memory controller 200 may generate dummy data DUMMY DATA having a size corresponding to the difference between the reference size and the size of the write data.

Referring to FIG. 9 as an example, the memory controller 200 may generate dummy data DUMMY DATA having a size corresponding to the difference between the size of the sequential buffer 310 and the size of the write data DATA1 to DATAm. Here, the size corresponding to the difference between the size of the sequential buffer 310 and the size of the write data DATA1 to DATAm may be, for example, the redundant storage capacity EMPTY illustrated in FIG. 7.

When the write data DATA1 to DATAm and the dummy data DUMMY DATA are stored in the sequential buffer 310, the memory controller 200 may provide a second address ADD2 of the temporary data area 112 and a program command PGM CMD to the memory device 100. The write data DATA1 to DATAm and the dummy data DUMMY DATA may be provided to the memory device 100, and may be stored in the temporary data area 112 of the memory device 100.

The second address ADD2 of the temporary data area 112 may be an address generated by the memory controller 200 with reference to a third mapping table MAP3 included in the map buffer 320.

The metadata (not illustrated) stored in the metadata area 113 of the memory device 100 may be updated when the write data DATA1 to DATAm is stored in the temporary data area 112.

Figure 10:
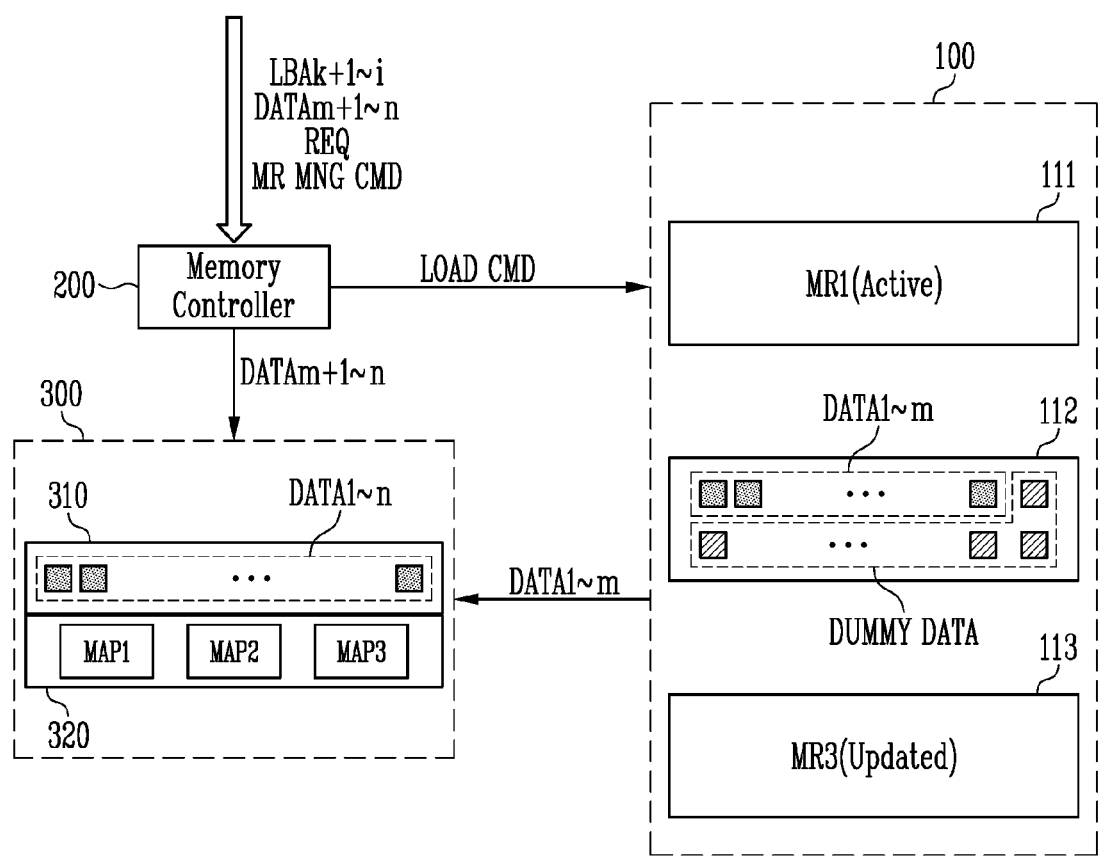
FIG. 10 shows an example where the write data stored in a temporary data area is loaded into a buffer memory.

FIG. 10 shows an example where the write data stored in a temporary data area is loaded into a buffer memory.

Referring to FIG. 10, in an embodiment, after write data DATA1 to DATAm has been stored in the temporary data area 112, the memory controller 200 may receive subsequent consecutive logical addresses LBAk+1 to LBAi (where i is a positive integer greater than k+1), subsequent write data DATAm+1 to DATAn, a subsequent write request REQ, and a manage command MR MNG CMD from the host 400. Here, the subsequent logical addresses LBAk+1 to LBAi of FIG. 10 are only examples for explaining an embodiment of the disclosed technology, and the disclosed technology is not limited thereto.

The subsequent write request REQ may be provided to the data storage device 1000 after the write request REQ of FIG. 7 has been provided to the data storage device 1000. In an embodiment, the subsequent write request REQ may contain sequential data area information (not illustrated). Hereinafter, for convenience of description, it is assumed that the write request REQ of FIG. 7 is a first write request and the subsequent write request REQ of FIG. 10 is a second write request.

The subsequent write data DATAm+1 to DATAn may be data provided from the host 400 after the write data DATA1 to DATAm has been stored in the temporary data area 112.

The manage command MR MNG CMD of FIG. 10 may be a command requesting the opening of a sequential data area 111 corresponding to the sequential data area information. That is, the manage command MR MNG CMD of FIG. 7 may be a zone open request that requests the generation of a mapping table (e.g., a first mapping table MAP1) for logical addresses corresponding to the sequential data area 111 corresponding to the sequential data area information.

The memory controller 200 may load the write data DATA1 to DATAm stored in the temporary data area 112 into the buffer memory 300 depending on whether the sequential data area information contained in the second write request (e.g., the subsequent write request REQ of FIG. 10) matches the sequential data area information contained in the first write request (e.g., the write request REQ of FIG. 7).

For example, when the sequential data area information contained in the first write request matches the sequential data area information contained in the second write request, the memory controller 200 may provide the memory device 100 with a load command LOAD CMD which instructs the write data DATA1 to DATAm stored in the temporary data area 112 to be loaded into the sequential buffer 310.

The memory device 100 may provide the write data DATA1 to DATAm, among pieces of data stored in the temporary data area 112, to the buffer memory 300 in response to the load command LOAD CMD.

The memory device 100 may acquire the write data DATA1 to DATAm, among pieces of data stored in the temporary data area 112, based on the metadata included in the metadata area 113.

The loaded write data DATA1 to DATAm may be stored in the sequential buffer 310 of the buffer memory 300.

The loaded write data DATA1 to DATAm and the subsequent write data DATAm+1 to DATAn, provided by the host 400, may be stored in the sequential buffer 310.

In some implementations, after a trigger event has occurred (e.g., after a sudden power-off has occurred or a zone close request has been provided), the memory controller 200 may load the write data DATA1 to DATAm stored in the temporary data area 112 into the buffer memory 300 in response to the manage command MR MNG CMD provided from the host 400 or a zone open request for the sequential data area 111. Then, the memory controller 200 may receive the subsequent logical addresses LBAk+1 to LBAi, the subsequent write data DATAm+1 to DATAn, the subsequent write request REQ, and the manage command MR MNG CMD.

Figure 11:
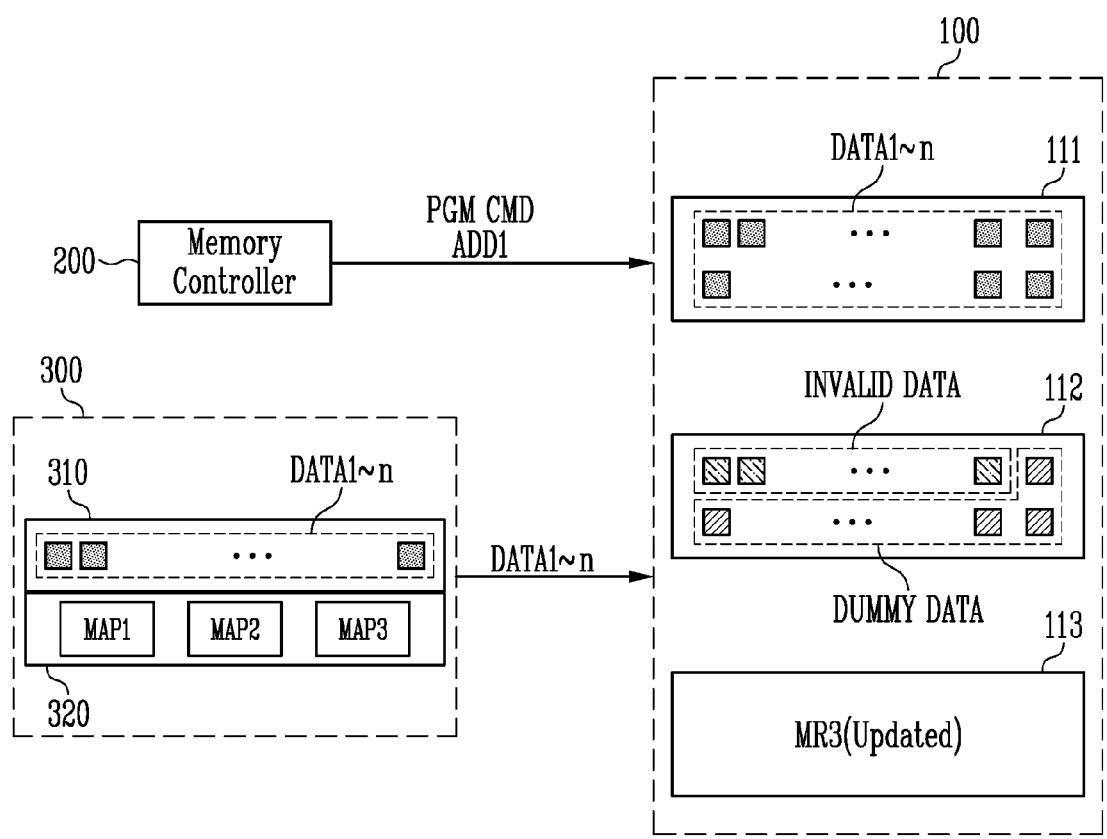
FIG. 11 shows an example where the write data having a size corresponding to a reference size is stored in a sequential data area.

FIG. 11 shows an example where the write data having a size corresponding to a reference size is stored in a sequential data area.

Referring to FIG. 11, when write data DATA1 to DATAm is loaded into the buffer memory 300, the memory controller 200 may control the memory device 100 so that the write data DATA1 to DATAm and subsequent write data DATAm+1 to DATAn are stored in any one of the sequential data area 111 and the temporary data area 112 depending on whether the sum of the size of the write data DATA1 to DATAm and the size of the subsequent write data DATAm+1 to DATAn is less than a reference size.

For example, when the sum of the size of the write data DATA1 to DATAm and the size of the subsequent write data DATAm+1 to DATAn is greater than the reference size, the memory controller 200 may control the memory device 100 so that part of the write data DATA1 to DATAn having a size corresponding to the reference size, among pieces of write data stored in the sequential buffer 310, is stored in the sequential data area 111 and the remaining write data (not illustrated) is stored in the temporary data area 112. In this case, the size of the remaining write data may be less than the reference size.

As illustrated in FIG. 11, the size of the write data DATA1 to DATAn stored in the sequential buffer 310 may correspond to the size of the sequential buffer 310. Therefore, the memory controller 200 may provide a first address ADD1 of the sequential data area 111 and a program command PGM CMD to the memory device 100. Further, the write data DATA1 to DATAn stored in the sequential buffer 310 may be provided to the memory device 100, and may be stored in the sequential data area 111 of the memory device 100.

The memory device 100 may provide a response indicating that the write data DATA1 to DATAn is stored in the sequential data area 111 to the memory controller 200.

The memory controller 200 may control the memory device 100 so that the write data DATA1 to DATAm stored in the temporary data area 112 is processed as invalid data INVALID DATA in response to the storage of the write data DATA1 to DATAn in the sequential data area 111.

The memory controller 200 may control the memory device 100 so that a background operation of maintaining the performance of the memory device 100 is performed based on the invalid data stored in the temporary data area 112. For example, when the size of the invalid data stored in the temporary data area 112 is greater than a predetermined size, the memory device 100 may perform garbage collection under the control of the memory controller 200. However, the disclosed technology is not limited thereto.

In accordance with the above description, only the write data DATA1 to DATAn is stored in the sequential data area 111, and thus there is an advantage in that a read operation may be performed faster without requiring a logic for distinguishing dummy data DUMMY DATA from the write data DATA1 to DATAn.

Figure 12:
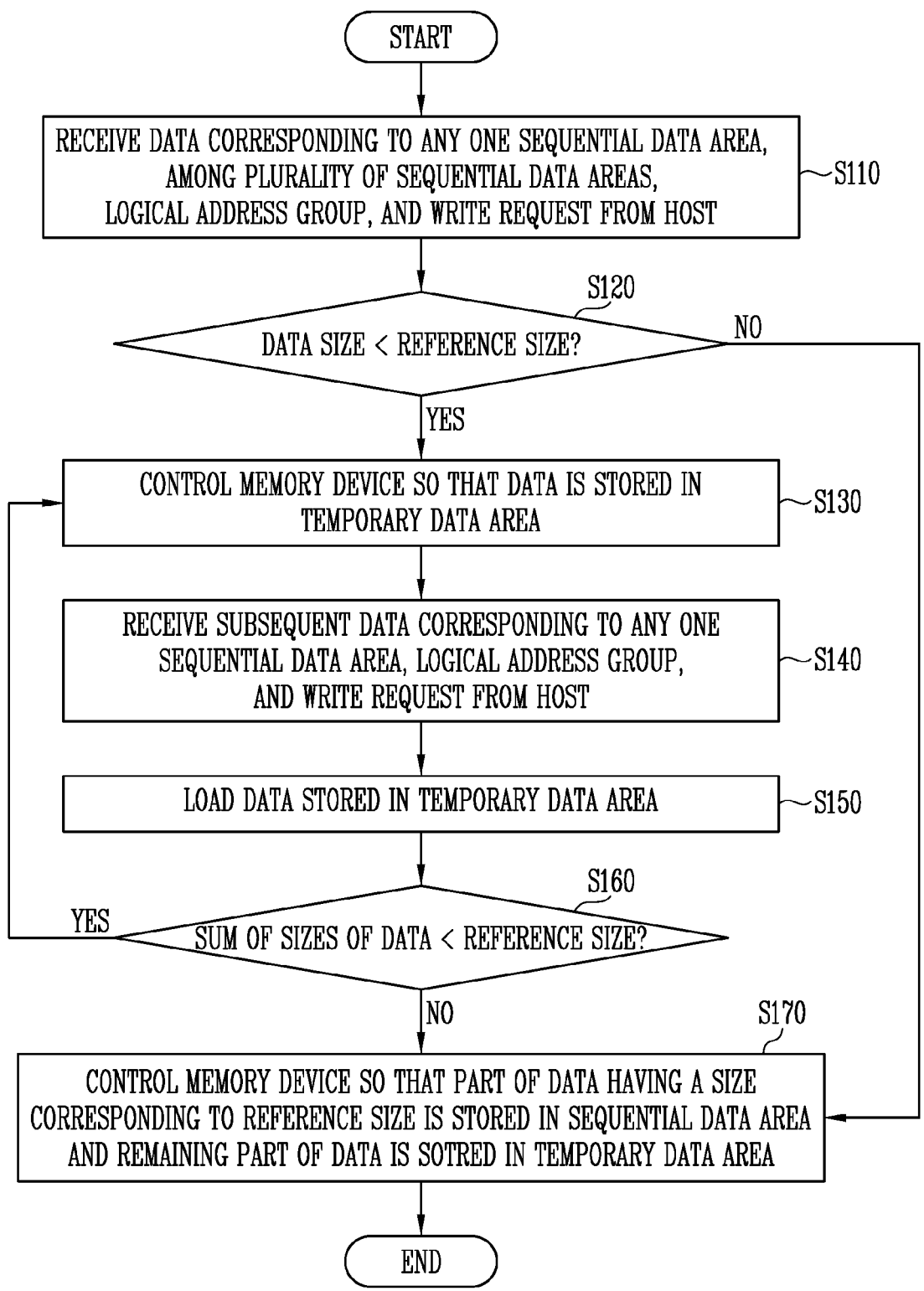
FIG. 12 is a flowchart illustrating a method of operating a data storage device based on an embodiment of the disclosed technology.

FIG. 12 is a flowchart illustrating a method of operating a data storage device based on an embodiment of the disclosed technology.

Referring to FIG. 12, the memory controller 200 included in the data storage device 1000 may receive data (e.g., write data DATA1 to DATAm of FIGS. 7 to 9) corresponding to any one sequential data area 111, among a plurality of sequential data areas, logical address group (e.g., LBA1 to LBAk of FIG. 7), and a write request (e.g., REQ of FIG. 70) from a host 400 at step S110.

Next, the memory controller 200 may determine whether the size of data (e.g., the size of write data DATA1 to DATAm of FIGS. 7 to 9) is less than a preset reference size at step S120.

When the size of data is less than the preset reference size (in the case of YES at step S120), the memory controller 200 may control the memory device 100 so that the data is stored in the temporary data area 112 at step S130. When the size of the data is equal to or greater than the reference size (in the case of NO at step S120), step S170 may be performed.

After the data has been stored in the temporary data area 112, the memory controller 200 may receive logical address group (e.g., LBA1 to LBAk of FIG. 10) corresponding to the sequential data area 111, data corresponding to the logical address group (e.g., subsequent write data DATAm+1 to DATAn of FIG. 10), and a write request (e.g., REQ of FIG. 10) from the host 400 at step S140. Here, the logical address group at step S110 may be identical to the logical address group at step S140.

The memory controller 200 may load the data stored in the temporary data area 112 (e.g., the write data DATA1 to DATAm of FIG. 10) into the buffer memory 300 at step S150.

The memory controller 200 may determine whether the sum of the sizes of data stored in the buffer memory 300 (e.g., the sizes of write data DATA1 to DATAn stored in the sequential buffer 310 illustrated in FIG. 11) is less than a reference size at step S160.

When the sum of the sizes of data is less than the reference size (in the case of YES at step S160), step S130 may be performed.

When the sum of the sizes of data is equal to or greater than the reference size (in the case of NO at step S160), the memory controller 200 may control the memory device 100 so that part of the data (e.g., write data DATA1 to DATAn of FIG. 11) having a size corresponding to the reference size is stored in the sequential data area 111 and the remaining part other than the part of the data is stored in the temporary data area 112 at step S170.

When the sum of the sizes of data is equal to or greater than the reference size (in the case of NO at step S160), step S130 may be performed.

Figure 13:
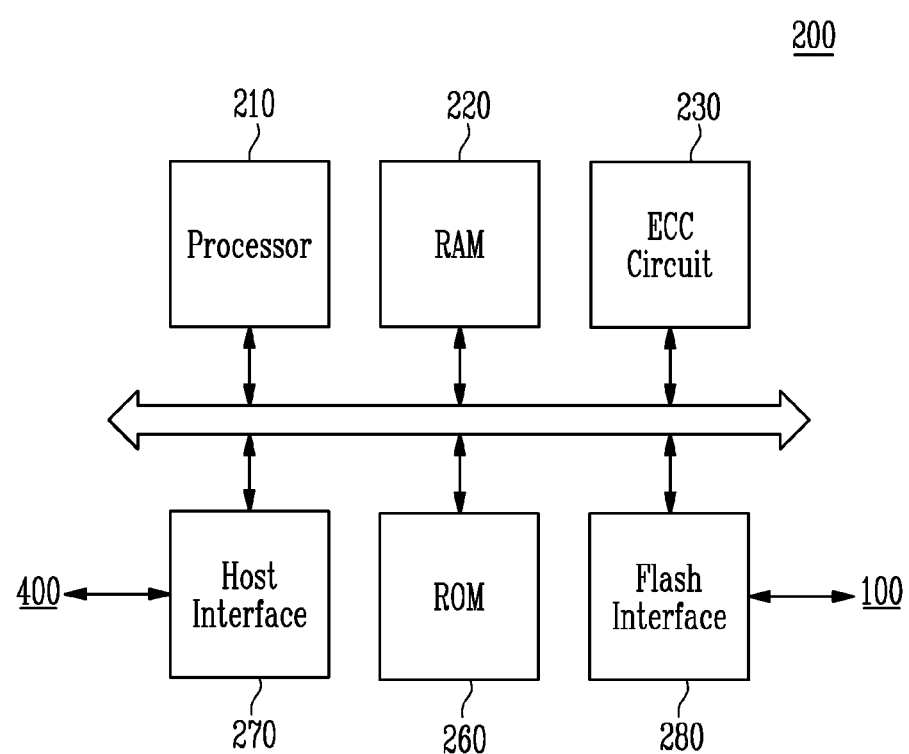
FIG. 13 is a diagram illustrating a memory controller based on an embodiment of the disclosed technology.

FIG. 13 is a diagram illustrating a memory controller based on an embodiment of the disclosed technology.

Referring to FIGS. 1 and 13, the memory controller 200 may include a processor 210, a RAM 220, an error correction circuit (ECC) 230, a ROM 260, a host interface 270, and a flash interface 280.

The processor 210 may control the overall operation of the memory controller 200.

The RAM 220 may be used as a buffer memory, a cache memory or a working memory of the memory controller 200. In an example, the buffer memory may be the RAM 220, and may be, for example, an SRAM.

The ROM 260 may store various types of information required for the operation of the memory controller 200 in the form of firmware.

The memory controller 200 may communicate with an external device (e.g., the host 400, an application processor or the like) through the host interface 270.

The memory controller 200 may communicate with the memory device 100 through the flash interface 280. The memory controller 200 may transmit a command CMD, an address ADDR, a control signal CTRL, etc. to the memory device 100 and receive data DATA from the memory device 100, through the flash interface 280.

The flash interface 280 may include, for example, a NAND interface.

Figure 14:
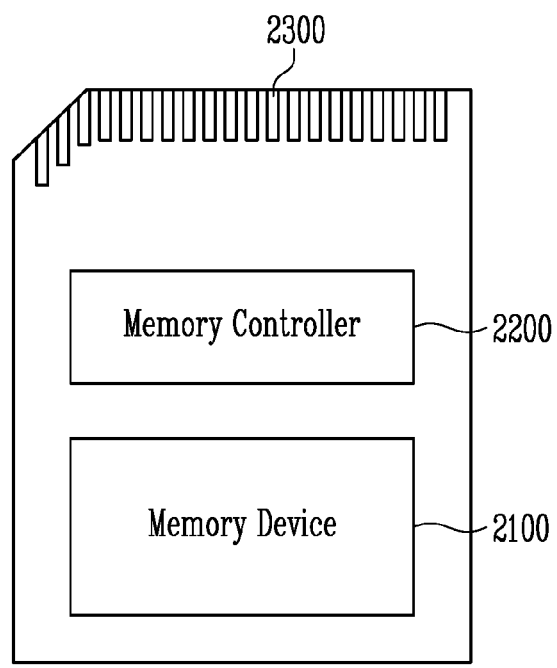
FIG. 14 is a block diagram illustrating a memory card system to which a data storage device based on an embodiment of the disclosed technology is applied.

FIG. 14 is a block diagram illustrating a memory card system to which a data storage device based on an embodiment of the disclosed technology is applied.

Referring to FIGS. 1 and 14, a memory card system 2000 may include a memory device 2100, a memory controller 2200, and a connector 2300.

In an embodiment, the memory device 2100 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2200 is coupled to the memory device 2100. The memory controller 2200 may access the memory device 2100. For example, the memory controller 2200 may control read, write, erase, and background operations of the memory device 2100. The memory controller 2200 may provide an interface between the memory device 2100 and a host 400. The memory controller 2200 may run firmware for controlling the memory device 2100. The memory controller 2200 may be implemented in the same manner as the memory controller 200, described above with reference to FIG. 1.

In an embodiment, the memory controller 2200 may include components, such as a RAM, a processor, a host interface, a memory interface, and an error correction circuit.

The memory controller 2200 may communicate with an external device through the connector 2300. The memory controller 2200 may communicate with an external device (e.g., the host 400) based on a specific communication protocol. In an embodiment, the memory controller 2200 may communicate with the external device through at least one of various interface protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) protocols. In an embodiment, the connector 2300 may be defined by at least one of the above-described various communication protocols.

The memory device 2100 and the memory controller 2200 may be integrated into a single semiconductor device to form a memory card. For example, the memory controller 2200 and the memory device 2100 may be integrated into a single semiconductor device, and may then form a memory card such as a personal computer memory card international association (PCMCIA), a compact flash card (CF), a smart media card (SM or SMC), a memory stick multimedia card (MMC, RS-MMC, MMCmicro or eMMC), a SD card (SD, miniSD, microSD, or SDHC), a universal flash storage (UFS), or the like.

Figure 15:
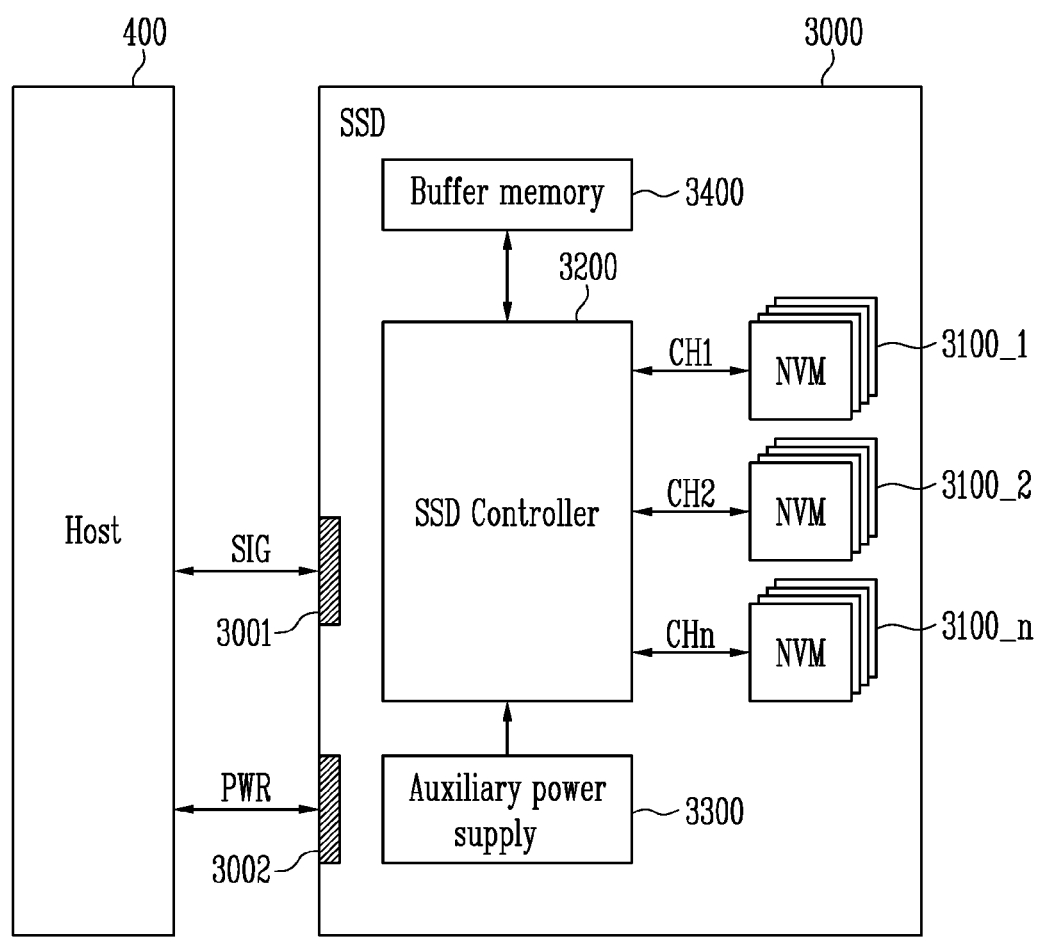
FIG. 15 is a block diagram illustrating a solid state drive (SSD) system including a data storage device implemented based on an embodiment of the disclosed technology.

FIG. 15 is a block diagram illustrating a solid state drive (SSD) system including a data storage device implemented based on an embodiment of the disclosed technology.

Referring to FIGS. 1 and 15, the SSD system may include a host 400 and an SSD 3000.

The SSD 3000 may exchange a signal SIG with the host 400 through a signal connector 3001, and may receive power PWR through a power connector 3002. The SSD 3000 may include an SSD controller 3200, a plurality of flash memories 3100_1, 3100_2, and 3100_n, an auxiliary power supply 3300, and a buffer memory 3400.

In accordance with an embodiment of the disclosed technology, the SSD controller 3200 may perform the function of the memory controller 200, described above with reference to FIG. 1.

The SSD controller 3200 may control the plurality of flash memories 3100_1, 3100_2, and 3100_n in response to the signal SIG received from the host 400. In an embodiment, the signal SIG may indicate signals based on the interfaces of the host 400 and the SSD 3000. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3300 may be coupled to the host 400 through the power connector 3002. The auxiliary power supply 3300 may be supplied with power PWR from the host 400, and may be charged. The auxiliary power supply 3300 may supply the power of the SSD 3000 when the supply of power from the host 400 is not smoothly performed. In an embodiment, the auxiliary power supply 3300 may be located inside the SSD 3000 or located outside the SSD 3000. For example, the auxiliary power supply 3300 may be located in a main board, and may also provide auxiliary power to the SSD 3000.

The buffer memory 3400 may temporarily store data. For example, the buffer memory 3400 may temporarily store data received from the host 400 or data received from the plurality of flash memories 3100_1, 3100_2, and 3100_n, or may temporarily store metadata (e.g., mapping tables) of the flash memories 3100_1, 3100_2, and 3100_n. The buffer memory 3400 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 16:
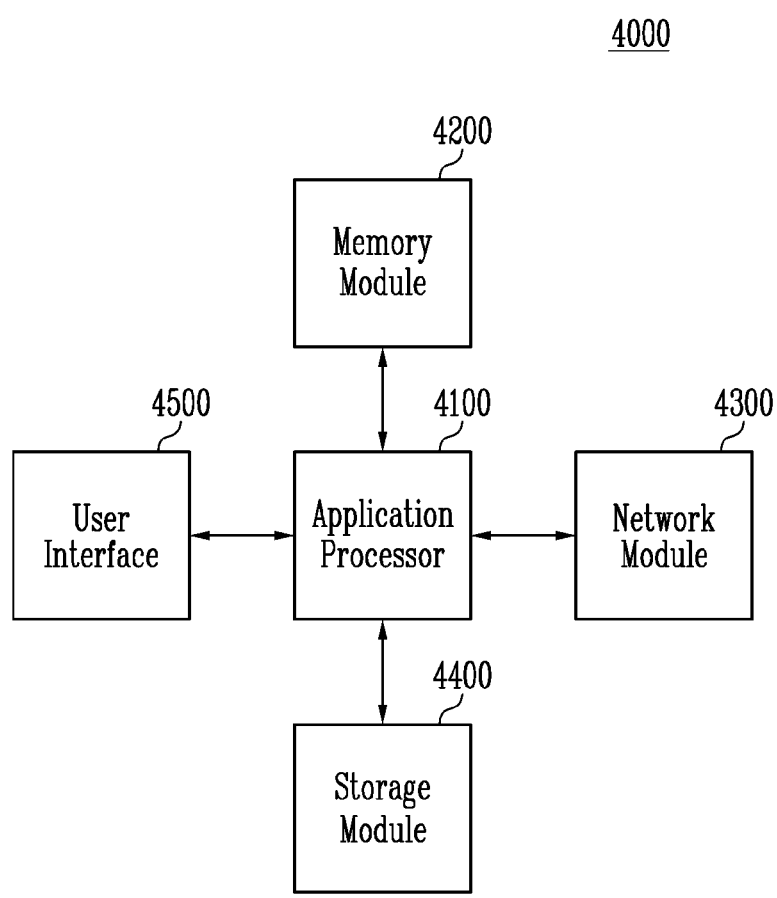
FIG. 16 is a block diagram illustrating a user system including a data storage device implemented based on an embodiment of the disclosed technology.

FIG. 16 is a block diagram illustrating a user system including a data storage device implemented based on an embodiment of the disclosed technology.

Referring to FIG. 16, a user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided in the form of a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, or WiFi. In an embodiment, the network module 4300 may be included in the application processor 4100.

The storage module 4400 may store data. For example, the storage module 4400 may store data received from the application processor 4100. In some implementations, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a 3D structure. In an embodiment, the storage module 4400 may be provided as a removable storage medium (removable drive), such as a memory card or an external drive of the user system 4000.

In an example, the storage module 4400 may be operated in the same manner as the data storage device 1000, described above with reference to FIG. 1. The storage module 4400 may include a plurality of nonvolatile memory devices, each of which may be operated in the same manner as the memory device 100, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may further include user output interfaces such as an a liquid crystal display (LCD), an organic light-emitting diode (OLED) display device, an active matrix OLED (AMOLED) display device, an LED, a speaker, and a monitor.

In accordance with the disclosed technology, there is provided a data storage device that can improve the speed of a read operation by performing the read operation without requiring a logic for distinguishing dummy data from write data.

Only a few implementations and examples are described and other implementations, enhancements and variations can be made based on what is described and illustrated in this patent document.

What is claimed is:

1. A data storage device, comprising:
a memory device including a plurality of first data areas and a temporary data area, each first data area and the temporary data area including memory cells structured to store data;
a buffer memory coupled to the memory device and configured to temporarily store the data received from a host before storing the data to the plurality of first data areas or the temporary data area; and
a memory controller configured to:
receive a first write request for storing the data and consecutive logical addresses from the host;
determine, among the temporary data area and the plurality of first data areas, a data area for storing the data, upon occurrence of a trigger event that requires the data to be stored in the memory device, based on first data area information included in the first write request and whether a size of the data is less than a preset reference size; and
store the data to the data area for storing the data, wherein consecutive physical addresses of the data area for storing the data respectively correspond to the consecutive logical addresses sequentially,
wherein the memory controller loads the data stored in the temporary data area into the buffer memory when subsequent data and a second write request corresponding to the subsequent data are received and stores the data and the subsequent data to either one of the first data areas or the temporary data area depending on whether a size of a sum of the data loaded into the buffer memory and the subsequent data is less than the reference size.

2. The data storage device according to claim 1, wherein the memory controller is configured to store the data in the temporary data area when the size of the data is less than the reference size.

3. The data storage device according to claim 2, wherein the memory controller is configured to:
generate additional data having a size corresponding to a difference between the reference size and the size of the data; and
store the data and the additional data in the temporary data area.

4. The data storage device according to claim 1, wherein the memory controller is configured to, when the size of the data is greater than the reference size, store a part of the data corresponding to the reference size, to the first data area, and store a remaining part of the data other than the part of the data to the temporary data area.

5. The data storage device according to claim 4, wherein the size of the remaining part of the data is less than the reference size.

6. The data storage device according to claim 1, wherein the memory controller is configured to:
after storing the data to the temporary data area, receive subsequent consecutive logical addresses, the subsequent data, and the second write request from the host, load the data stored in the temporary data area into the buffer memory depending on whether first data area information included in the second write request matches the first data area information included in the first write request, and
store, upon loading the data stored into the buffer memory, the data and the subsequent data to either one of the first data areas or the temporary data area depending on whether the sum of the size of the data and the size of the subsequent data is less than the reference size.

7. The data storage device according to claim 1, wherein:
the trigger event is a sudden power-off that results in an interruption of a power supply to the data storage device;
the memory controller controls the memory device so that the data is stored in the temporary data area; and
the size of the data is less than the reference size.

8. The data storage device according to claim 7, wherein the memory controller is configured to:
upon occurrence of the sudden power-off, load the data stored in the temporary data area into the buffer memory in response to a zone open request for the first data area, provided by the host;
receive subsequent consecutive logical addresses, the subsequent data, and the second write request corresponding to the subsequent data from the host; and
store the data and the subsequent data to either one of the first data areas or the temporary data area depending on whether the sum of the size of the data and the size of the subsequent data is less than the reference size,
wherein, upon receipt of the zone open request, a mapping table for mapping logical addresses corresponding to the first data area is generated.

9. The data storage device according to claim 1, wherein:
the trigger event is a zone close request provided by the host;
the zone close request indicates that a write request for the first data area is not to be made until a zone open request for the first data area is input;
the zone open request is configured to request generation of a mapping table for logical addresses corresponding to the first data area;
the memory controller stores the data in the temporary data area; and
the size of the data is less than the reference size.

10. The data storage device according to claim 9, wherein the memory controller is configured to:
upon receipt of the zone close request, load the data stored in the temporary data area into the buffer memory in response to the zone open request provided by the host;
receive subsequent consecutive logical addresses, the subsequent data, and the second write request corresponding to the subsequent data from the host; and
store the data and the subsequent data to either one of the first data areas or the temporary data area depending on whether a sum of the size of the data and a size of the subsequent data is less than the reference size.

11. The data storage device according to claim 1, wherein the reference size is a size of a unit for program corresponding to a size of data stored in the memory device by performing one program operation.

12. The data storage device according to claim 1, wherein the buffer memory stores a first mapping table including mapping between a plurality of logical address groups and the plurality of first data areas, a second mapping table including mapping between logical addresses and first physical addresses of the plurality of first data areas, and a third mapping table including mapping between the logical addresses and second physical addresses of the temporary data area.

13. A data storage device, comprising:
a memory device including a sequential data area and a temporary data area, each sequential data area and the temporary data area including a plurality of memory cells structured to store data;
a buffer memory coupled to the memory device and configured to temporarily store the data received from a host before storing the data to the plurality of sequential data areas or the temporary data area; and
a memory controller configured to receive a write request for storing the data and consecutive logical addresses from the host and store, upon occurrence of a trigger event that requires the data to be stored into the memory device, the data to the temporary data area,
wherein a size of the data is less than a size of a unit for program corresponding to a size of data stored in the memory device by one program operation performed by the memory device, and
wherein the memory controller loads the data stored in the temporary data area, into the buffer memory when subsequent data, subsequent consecutive logical addresses and a subsequent write request corresponding to the subsequent data are received from the host, determines whether the data and the subsequent data being stored to the sequential data area depending on whether a size of a sum of the data loaded into the buffer memory and the subsequent data is less than the size of the program unit, and store the data and the subsequent data to the sequential data area, wherein consecutive physical addresses of the sequential data area respectively correspond to the consecutive logical addresses and the subsequent consecutive logical addresses sequentially based on a result of determination.

14. The data storage device according to claim 13, wherein the memory controller is configured to:
generate additional data having a size corresponding to a difference between the size of the program unit and the size of the data; and
store the data and the additional data in the temporary data area.

15. The data storage device according to claim 13, wherein the trigger event is a sudden power-off that results in an interruption of a power supply to the data storage device.

16. The data storage device according to claim 15, wherein:
upon occurrence of the sudden power-off, the memory controller loads the data stored in the temporary data area into the buffer memory in response to a zone open request for the sequential data area provided by the host, receives the subsequent consecutive logical addresses, the subsequent data, and the subsequent write request from the host, and store the data and the subsequent data to the sequential data area;
the sum of the size of the data and the size of the subsequent data corresponds to the size of the program unit; and
upon receipt of the zone open request, mapping tables for mapping logical addresses corresponding to the sequential data area is generated.

17. The data storage device according to claim 13, wherein:
the trigger event is a zone close request provided by the host,
the zone close request indicates that a write request for the sequential data area is not to be made until a zone open request for the sequential data area is input, and
the zone open request is configured to request generation of a mapping table for logical addresses corresponding to the sequential data area.

18. The data storage device according to claim 17, wherein the memory controller is configured to:
upon receipt of the zone close request, load the data stored in the temporary data area into the buffer memory in response to the zone open request provided by the host;
receive subsequent consecutive logical addresses, subsequent data, and the subsequent write request corresponding to the subsequent data from the host; and
store the data and the subsequent data to the sequential data area, and
wherein the sum of the size of the data and the size of the subsequent data corresponds to the size of the unit for program.

19. The data storage device according to claim 13, wherein the buffer memory stores a first mapping table including mapping between a plurality of logical address groups and the plurality of sequential data areas, a second mapping table including mapping between logical addresses and first physical addresses of the plurality of sequential data areas, and a third mapping table including mapping between the logical addresses and second physical addresses of the temporary data area.

20. A method of operating a memory controller, the memory controller controlling a memory device including a plurality of sequential data areas and a temporary data area, the method comprising:
receiving data corresponding to any one sequential data area, among a plurality of sequential data areas, a logical address group including consecutive logical addresses, and a first write request from a host;
controlling the memory device so that the data is stored in any one of the sequential data area and the temporary data area depending on whether a size of the data is less than a preset reference size,
receiving subsequent data, subsequent consecutive logical addresses and a second write request corresponding to the subsequent data from the host, after storing the data to the temporary data area,
loading the data stored in the temporary data area depending on whether first data area information included in the second write request matches first data area information included in the first write request;
determining a data area for storing the data and the subsequent data, among one of the sequential data areas and the temporary data area based on whether a size of a sum of the data and the subsequent data is less than the reference size; and
storing the data and the subsequent data to the data area for storing the data, wherein consecutive physical addresses of the data area for storing the data respectively correspond to the consecutive logical addresses and the subsequent consecutive logical addresses sequentially.

* * * * *